(12) United States Patent
Naunheimer

(10) Patent No.: US 7,878,737 B2
(45) Date of Patent: Feb. 1, 2011

(54) APPARATUS FOR TRANSFERRING PARTICLES

(75) Inventor: Christopher Naunheimer, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/340,842

(22) Filed: Dec. 22, 2008

(65) Prior Publication Data

US 2010/0158771 A1 Jun. 24, 2010

(51) Int. Cl.
*B65G 51/22* (2006.01)

(52) U.S. Cl. .................... 406/192; 406/123; 406/22; 406/23; 406/34; 406/136; 406/198; 208/173; 208/176

(58) Field of Classification Search .............. 406/12, 406/22, 23, 34, 136, 192, 197, 198; 414/217, 414/220; 208/173, 176, 147
See application file for complete search history.

(56) References Cited

U.S. PATENT DOCUMENTS

| | | | | |
|---|---|---|---|---|
| 2,562,804 A * | 7/1951 | Martin et al. ................. 502/38 |
| 2,705,080 A * | 3/1955 | Hicks ........................ 414/220 |
| 2,851,401 A * | 9/1958 | Payne ........................ 208/173 |
| 2,851,402 A * | 9/1958 | Haddad ...................... 208/175 |
| 2,985,324 A * | 5/1961 | Balentine ................... 414/217 |
| 3,067,131 A * | 12/1962 | Bergstrom .................. 208/173 |
| 3,692,496 A | 9/1972 | Greenwood et al. ........ 23/288 G |
| 4,108,500 A * | 8/1978 | Stamer ........................ 406/12 |
| 4,341,740 A * | 7/1982 | Greenwood ................. 422/310 |
| 4,403,909 A * | 9/1983 | Greenwood ................. 414/805 |
| 4,758,118 A * | 7/1988 | Rachner et al. ............... 406/24 |
| 5,143,521 A * | 9/1992 | Dewitz ........................ 48/210 |
| 5,338,440 A | 8/1994 | Sechrist et al. ............. 208/173 |
| 5,500,110 A | 3/1996 | Sechrist et al. ............. 208/173 |
| 5,558,472 A * | 9/1996 | Ogawa et al. ................. 406/12 |
| 5,916,529 A * | 6/1999 | Scheuerman ................ 422/141 |
| 6,395,664 B1 * | 5/2002 | Boehner et al. ............... 502/22 |
| 6,969,496 B2 | 11/2005 | Vetter et al. ................. 422/221 |
| 6,994,497 B1 * | 2/2006 | Eriksson et al. ............. 406/124 |
| 7,172,685 B2 * | 2/2007 | Thompson et al. ....... 208/208 R |
| 7,600,950 B2 * | 10/2009 | Yuan .......................... 406/156 |

OTHER PUBLICATIONS

Jenike, A.W., "Storage and Flow of Solids" Bulletin No. 123, Utah Engineering Experiment Station, University of Utah, Salt Lake City, Utah; vol. 53, No. 26, Sixth Printing (revised) Mar. 1970.
U.S. Appl. No. 11/832,008, filed Aug. 1, 2007, David J. Fecteau et al.

(Continued)

*Primary Examiner*—Jose Dillon, Jr.
(74) *Attorney, Agent, or Firm*—David J Piasecki

(57) ABSTRACT

Method and apparatus are provided for transferring particles from an upper zone through an intermediate zone to a lower zone. A valveless conduit provides particle communication from the upper zone to the middle zone and a valved conduit provides particle communication from the middle zone to the lower zone. The transfer of particles between the zones through the conduits is regulated by varying the pressure of the middle zone, the flow rate of gas passing through the valveless conduit, and the valve in the valved conduit.

20 Claims, 3 Drawing Sheets

OTHER PUBLICATIONS

U.S. Appl. No. 11/832,059, filed Aug. 1, 2007, David J. Fecteau et al.
U.S. Appl. No. 12/261,109, filed Oct. 30, 2008, Christopher Naunheimer et al.
U.S. Appl. No. 12/261,115, filed Oct. 30, 2008, Christopher Naunheimer et al.
U.S. Appl. No. 12/332,559, filed Dec. 11, 2008, Christopher Naunheimer et al.
U.S. Appl. No. 12/332,564, filed Dec. 11, 2008, Christopher Naunheimer et al.
U.S. Appl. No. 12/273,689, filed Nov. 19, 2008, Christopher Naunheimer et al.
U.S. Appl. No. 12/332,567, filed Dec. 11, 2008, Christopher Naunheimer et al.
U.S. Appl. No. 12/361,181, filed Jan. 28, 2009, Christopher Naunheimer et al.
U.S. Appl. No. 12/361,186, filed Jan. 28, 2009, Christopher Naunheimer et al.

* cited by examiner

APPARATUS FOR TRANSFERRING PARTICLES

FIELD OF THE INVENTION

This invention generally relates to the art of solid particle transport. More specifically, the invention relates to methods and apparatus for transferring particles from an upper zone through a middle zone to a lower zone.

BACKGROUND OF THE INVENTION

There are many chemical processes where it is necessary to bring into contact a fluid and a solid particulate matter, such as adsorbents and catalysts. Frequently, chemical reactions as well as physical phenomena occur for a predetermined period of time in the contact zone, e.g. a reaction or adsorption zone. In many of these processes, the particles are transported between two or more particle containing vessels. The particles may be transported for a variety of reasons depending on the process. For example, particles may be transported from one contacting vessel or zone into another contacting zone in order to take advantage of different process conditions to improve product yields and/or purity. In another example, particles may be transported from a reaction zone into a regeneration zone in order to rejuvenate the particles, and after rejuvenation, the particles may be transported back to the reaction zone. The particles may be introduced to and withdrawn from the vessels or zones in a continuous or semi-continuous manner sufficient to maintain the desired contacting process continuously.

The vessels between which the catalyst is transported are not necessarily adjacent. The outlet of the source vessel from which the catalyst is transported may be a significant distance horizontally and/or vertically from the inlet of the destination vessel to which the catalyst is transported. Pneumatic conveying through a conduit is a well known and commonly used method of transferring catalyst over vertical and horizontal distances. One characteristic of pneumatic conveying is that because of the pressure difference across the conduit between the source and destination, the destination pressure must be less than the source pressure to account for the pressure drop across the pneumatic conveying system. However, process conditions may require the destination vessel to operate at a higher pressure than this value (source pressure minus pneumatic conveying system pressure drop). Examples include circulating particles between two zones maintained at different pressures; and transferring particles from one vessel to another where both vessels are maintained at the same pressure. Under such conditions, a pneumatic conveying system alone is insufficient to transfer the particles.

A lock hopper is commonly used to transfer particles from a lower pressure zone to a higher pressure zone. The use of lock hoppers in conjunction with pneumatic conveying is also well known in the art to transfer particles between vessels or zones that are maintained at different pressures. First, a lock hopper transfers particles from the upper, low pressure source zone to a middle zone, and then to a lower, high pressure zone. A pneumatic conveying system then transfers the particles from the high pressure zone to the destination zone. Although the destination zone has a pressure less than that of the high pressure zone, the destination zone pressure may be greater than that of the low pressure source. In the art, the term "lock hopper" has been used to designate the combination of the upper, middle, and lower zones, and "lock hopper" has been used to designate only the middle zone.

In one example, the flow of particles from an upper vessel into the middle zone and out of the middle zone into a lower zone is controlled by valves located in the conduits or transfer pipes that connect the zones. The valves may be double block-and-bleed ball valves. Thus, a batch of particles may be transferred to the middle zone through the upper valve or valves when the lower valve or valves are closed. The middle zone may then be isolated by closing the upper valve(s). Various conduits may be connected to the isolated volume to introduce or remove the fluid phase, usually gas, or change the pressure inside the middle zone. For example, a regenerated catalyst may enter the vessel, be purged with nitrogen to remove oxygen, and pressured with hydrogen before being transferred to the reactor which is at a higher pressure than the regenerated catalyst. After catalyst exits the middle zone, the middle zone can be purged with nitrogen to remove the hydrogen before filling again with catalyst. Apparatus using valves in conduits that convey particles are disclosed in U.S. Pat. No. 3,692,496 and U.S. Pat. No. 5,840,176.

U.S. Pat. No. 4,576,712 discloses a method and apparatus for maintaining a substantially continuous gas flow through particulate solids in two zones. The solids are moved from a low pressure zone to a high pressure zone by means of a valveless lock hopper system. Maintenance of gas flow while simultaneously transferring particles between zones is accomplished without the use of moving equipment such as valves.

U.S. Pat. No. 4,872,969 discloses a method and apparatus for controlling the transfer of particles between zones of different pressure using particle collection and particle transfer conduits. The solids are moved from a low pressure zone to a high pressure zone by means of a valveless lock hopper system that vents all of the gas from the collection zones through the particle collection conduits. The venting of gas is accomplished by varying the size of the transfer conduits between zones.

As is known in the art, physical characteristics of the particles and basic process information such as the operating pressure in the upper and lower zones and the acceptable range of gas flow rates are initial design information. Processes are designed from this basic information and standard particle and gas engineering principles to routinely provide stable operating units. Surprisingly, it has been found that a particular valveless lock hopper unit will operate predominantly in a stable manner but experience sporadic upsets. These upsets involving a sudden surge of particles from one zone to another, which may reverse the particle flow, have been unpredictable with respect to which unit will be affected, and which particle transfer cycle will experience an upset in an affected unit. These upsets occur despite conformance to the same design methods. Such upsets interrupt the consistent flow of particles and can physically damage the particles as well as the equipment.

Consequently, there is desire to eliminate these sporadic upsets in order to minimize damage to the equipment and particles and ensure the consistent flow of particles. The consistent flow or transfer of particles involves a series of steps which can be repeated in a cyclic manner to transfer the particles in batches. Although it remains unpredictable whether an upset will occur during any particular cycle in an apparatus, it has been discovered that the upsets usually occur during the middle zone depressurization step or the middle zone empty step. The invention provides an improved method and apparatus that eliminates these sporadic upsets.

SUMMARY OF THE INVENTION

The invention is a method and apparatus for transferring particles from an upper zone through a middle zone to a lower zone where the upper and middle zones are connected by a valveless particle transfer conduit and the middle and lower zones are connected by a valved particle transfer conduit. The lower zone may have a higher pressure than the upper zone. The transfer of particles from the upper zone to the lower zone is controlled by varying the pressure of the middle zone, the flow rate of gas passing upwards through the valveless conduit, and a valve in the valved transfer conduit. The combination of an upper valveless conduit and a lower valved conduit provides a more stable particle transfer system by eliminating the unexpected and unpredictable upsets. The invention also demonstrates that there is little or no damage to the particles and/or the equipment despite the presence of moving equipment such as valves in a particle transfer conduit.

In a broad embodiment, the invention is a method for transferring particles from an upper zone, through a middle zone, to a lower zone comprising: transferring particles downward from the upper zone to the middle zone through an upper valveless conduit; increasing the middle zone pressure; opening a valve in a lower valved conduit; transferring particles downward from the middle zone to the lower zone through the lower valved conduit, and transferring gas from the middle zone upward through the upper valveless conduit into the upper zone; decreasing the middle zone pressure; and closing the valve in the lower valved conduit.

In another broad embodiment, the invention is an apparatus for transferring particles comprising: an upper zone; a middle zone; a lower zone; an upper valveless conduit extending from the upper zone to the middle zone; a lower valved conduit comprising a first valve, the lower valved conduit extending from the middle zone to the lower zone; and a first gas conduit in fluid communication with the middle zone.

In another broad embodiment, the invention is a moving bed hydrocarbon conversion process comprising: contacting a catalyst moving downward through a reaction zone with a hydrocarbon feed; withdrawing the catalyst from the reaction zone; conveying the catalyst to a regeneration zone wherein the catalyst moves downward through the regeneration zone; withdrawing the catalyst from the regeneration zone and passing the catalyst downward to an upper zone of a particle transfer apparatus; transferring the catalyst downward from the upper zone of the particle transfer apparatus to a middle zone of the particle transfer apparatus through an upper valveless conduit of the particle transfer apparatus; increasing the middle zone pressure; opening a valve in a lower valved conduit of the particle transfer apparatus; transferring the catalyst downward from the middle zone to the lower zone through the lower valved conduit, and transferring gas from the middle zone upward through the upper valveless conduit into the upper zone; closing the valve in the lower valved conduit; decreasing the middle zone pressure; and conveying the catalyst from the lower zone to the reaction zone; wherein a pressure of the lower zone is greater than a pressure of the upper zone.

Figure 1:
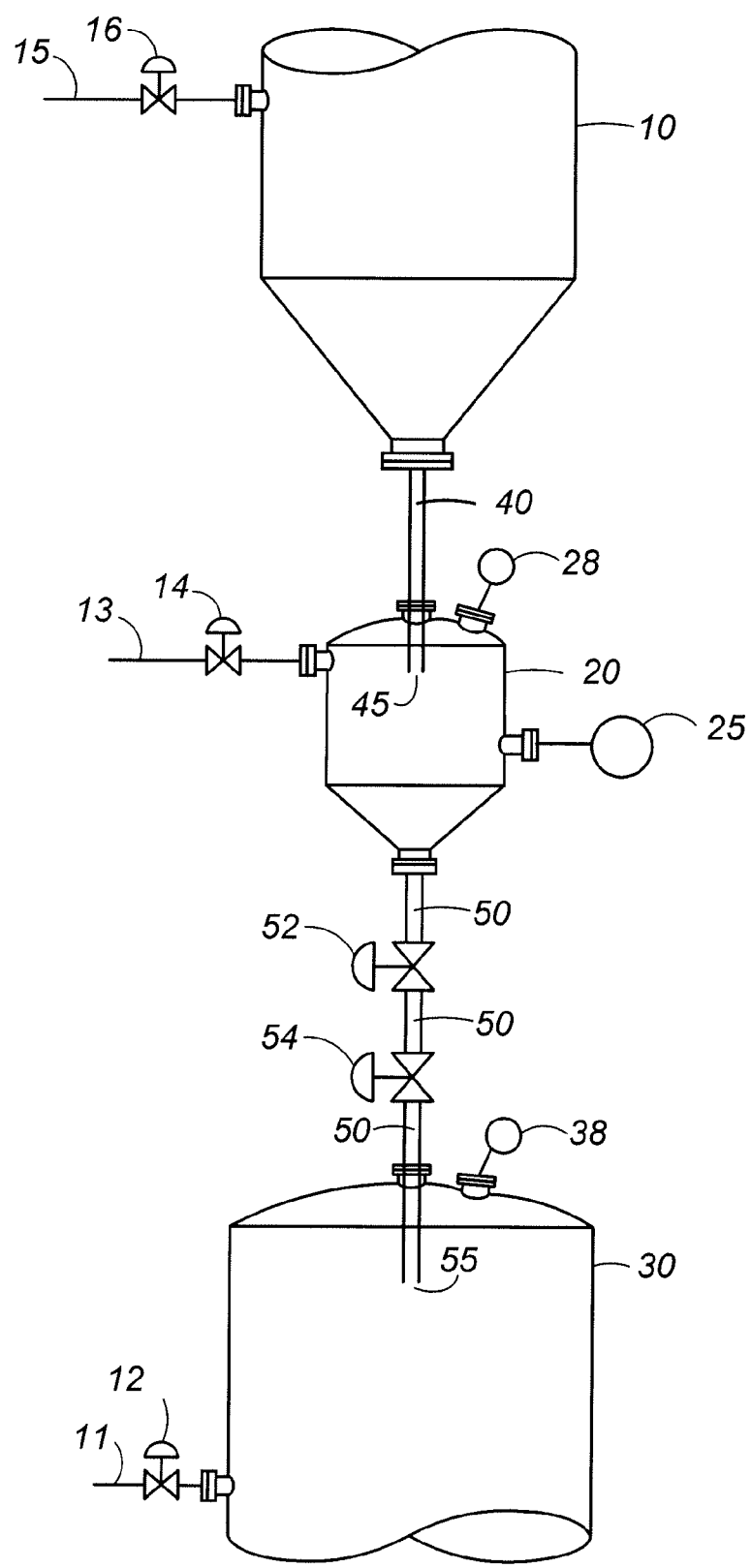
FIG. 1 is a representative view depicting the zones of the apparatus in different vessels and an embodiment of the lower valved conduit.

The Figures are intended to be illustrative of the invention and are not intended to limit the scope of the invention as set forth in the claims. The drawings are simplified diagrams showing exemplary embodiments helpful for an understanding of the invention. Details well known in the art, such as cone deflectors, control valves, instrumentation, and similar hardware which are non-essential to an understanding of the invention may not be shown.

DETAILED DESCRIPTION OF THE INVENTION

The invention may be used to transfer solid particulate matter from an upper zone, through a middle zone, to a lower zone where the lower zone pressure is greater than the upper zone pressure. Generally, particles received in an upper zone are transferred through an upper valveless standpipe or transfer conduit to a middle zone. That is, the upper transfer conduit does not include moving equipment such as valves which would block the particle flow path to the middle zone. A lower valved standpipe or transfer conduit is used to transfer the particles from the middle zone to a lower zone. That is, the lower transfer conduit comprises at least one valve. Thus, the zones and transfer conduits may be in particle communication and the transfer conduits may provide particle communication.

The invention can be used within and/or between a variety of process units to transfer particles, such as catalyst and adsorbents. The upper zone of the invention may receive particles from a separate process zone and the lower zone may deliver the particles to another separate process zone. For example, an associated process unit may include a separate vessel that operates as a reaction zone which provides catalyst particles to the upper zone, and the lower zone may deliver catalyst to a separate process vessel such as a feed hopper of a pneumatic conveying apparatus which in turn delivers the catalyst to the top of another reactor. In another embodiment, the invention may be arranged so that the upper zone and/or the lower zone are integrated with a process unit such that one or more process steps, or portions thereof, occurs within the upper and/or lower zones or the vessel(s) which contain the upper and/or lower zones. For example, the upper zone may be the lower portion of a reduction zone vessel or the entire reduction zone vessel of a process unit and/or the lower zone may be the upper portion of a surge vessel or the entire surge vessel of a process unit. The surge vessel in turn may introduce the particles into other zones of the same or a different process unit.

The invention may communicate with or the invention may comprise a portion of a process unit which provides for changing the fluid that contacts the particles. For example, the process unit may involve contacting catalyst with a gas containing hydrocarbons and/or hydrogen in a reaction zone and removing carbon deposits from the catalyst using a gas containing oxygen in a regeneration zone. As the catalyst is transferred between the reaction and regeneration zones, care must be taken to prevent mixing of the hydrocarbon/hydrogen atmosphere and the oxygen atmosphere. Examples of hydrocarbon conversion processes that may employ the invention include: alkylation, hydrorefining, hydrocracking, dehydrogenation, hydrogenation, hydrotreating, isomerization, dehydroisomerization, dehydrocyclization, and steam reforming.

One widely practiced hydrocarbon conversion process that may employ the invention is catalytic reforming using particles of catalyst. Exemplary reaction and regeneration zones are disclosed in, e.g., U.S. Pat. No. 5,858,210.

The upper, middle, and lower zones of the invention may be separate vessels or portions of separate vessels that are connected by the transfer conduits. In another embodiment, a single vessel comprises the upper zone, the middle zone, and optionally the lower zone. The upper, middle, and lower zones of the invention may also provide one or more functions or process steps of an associated process unit. In an embodiment, the upper, middle, and lower zones may be aligned sufficiently vertically to allow catalyst to flow, at least in part, by gravity from at least one vessel at a higher elevation to at least one vessel at a lower elevation. Thus, one or both of the upper and lower particle transfer conduits may be oriented vertically. In an embodiment one or both of the upper and lower particle transfer conduits is angled relative to true vertical.

In general, flow of the particles into and out of the middle zone may be controlled by regulating the pressure of the middle zone, the flow rate of gas through the upper valveless particle transfer conduit, and a valve in the lower valved particle transfer conduit. The flow path of the gas may also be varied. The same basic method steps may be accomplished by various configurations of gas and particle conduits to introduce, vent, and change the flow path of the gas used to control particle transfers. Existing configurations and control schemes can be readily adapted to employ the invention.

The method of transferring particles from upper zone 10 to lower zone 30 may be accomplished by repeating the following four step cycle: 1) a fill or load step wherein particles are transferred from the upper zone to the middle zone; 2) a pressurization step wherein the middle zone pressure is increased; 3) an empty step wherein particles are transferred from the middle zone to the lower zone; and 4) a depressurization step wherein the middle zone pressure is decreased. The steps may overlap. For example, transfer of particles to the middle zone may begin while the middle zone pressure continues to decrease and the middle zone pressure may begin to increase or decrease while particles continue to transfer.

A single cycle results in the transfer of one batch of particles from the upper zone to the lower zone. The time required to complete one cycle, i.e. the cycle time, will depend on a variety of factors including: the properties of the particles; the batch size, or amount of particles transferred per cycle; and the times needed to change the pressure of the middle zone. The invention is not limited by the cycle time. In an embodiment, the cycle time may be about 50 seconds. In another embodiment, the cycle time may be less than about 10 minutes, and the cycle time may be between about 2 minutes and about 4 minutes. A controller such as process control computers and programmable controllers may be used to regulate the cycle. The controller may receive various inputs, e.g. signals from particle level sensors, pressure gauges or indicators, differential pressure sensors, and timers such as for an individual step and/or the overall cycle. The controller may also send signals for example to open, close, and adjust valves to control the flow pattern and rate of various gas steams and the valve or valves in the lower valved conduit. Such a controller and related signals are not shown in the Figures as they are not essential to the invention and are well known to the skilled artisan.

Broad embodiments of the invention will now be described with reference to FIG. 1. In step 1 of the method, particles are transferred from upper zone 10 to middle zone 20 through upper valveless conduit 40. The upper and middle zones are at approximately the same pressure during step 1. Gas ascending through upper valveless conduit 40, if any, is insufficient to retain the particles in conduit 40. During step 1, gas may enter lower zone 30 through optional gas inlet conduit 11. Gas may also enter lower zone 30 from an associated process zone, not shown. Valve 12 may regulate the quantity of gas flowing into lower zone 30; this flow rate may be varied independently of the invention by means, not shown, for controlling the pressure of lower zone 30. Gas used in the invention is selected to be compatible with the particles being transferred and may be the same gas as used in the associated process unit. Nitrogen, hydrogen, and air are non-limiting examples of gas that may be used.

During step 1, valve 52 in lower valved conduit 50 is closed to retain the particles in middle zone 20. Valve 52 may be referred to as a particle retention valve. Valve 52 may also provide a gas tight seal. Valves used in particle transfer apparatus are commercially available and well known in the art. In an embodiment, valve 52 may be a rotary shaft valve, rotating disc valve, or a slide valve. Rotary shaft valves include, but are not limited to: ball type, segmented ball type, and v-notch ball type. Additional valves such as valve 54 may be used in lower valved conduit 50. In an embodiment, valve 54 is a gas tight valve to essentially prevent the flow of gas between the middle and lower zones through valved conduit 50. As is well known in the art, closed valves may leak even when operating properly. Valves may be classified by how much they leak when closed compared to the full open valve capacity. See for example, http://www.engineeringtoolbox.com/control-valves-leakage-d_484.html, last viewed on Dec. 19, 2008. The term "gas tight" as used herein means that the gas leakage through the valve when closed is equal to or less than a Class IV valve per ANSI standard FCI 70-2 1976(R1982). Such valves may also be referred to as "metal to metal" and are classified as having a leakage of 0.01% of full open valve capacity under the test conditions. Valves that are not gas tight will have higher leakage values than this gas tight standard and may be described as providing fluid communication when closed.

Figure 2:
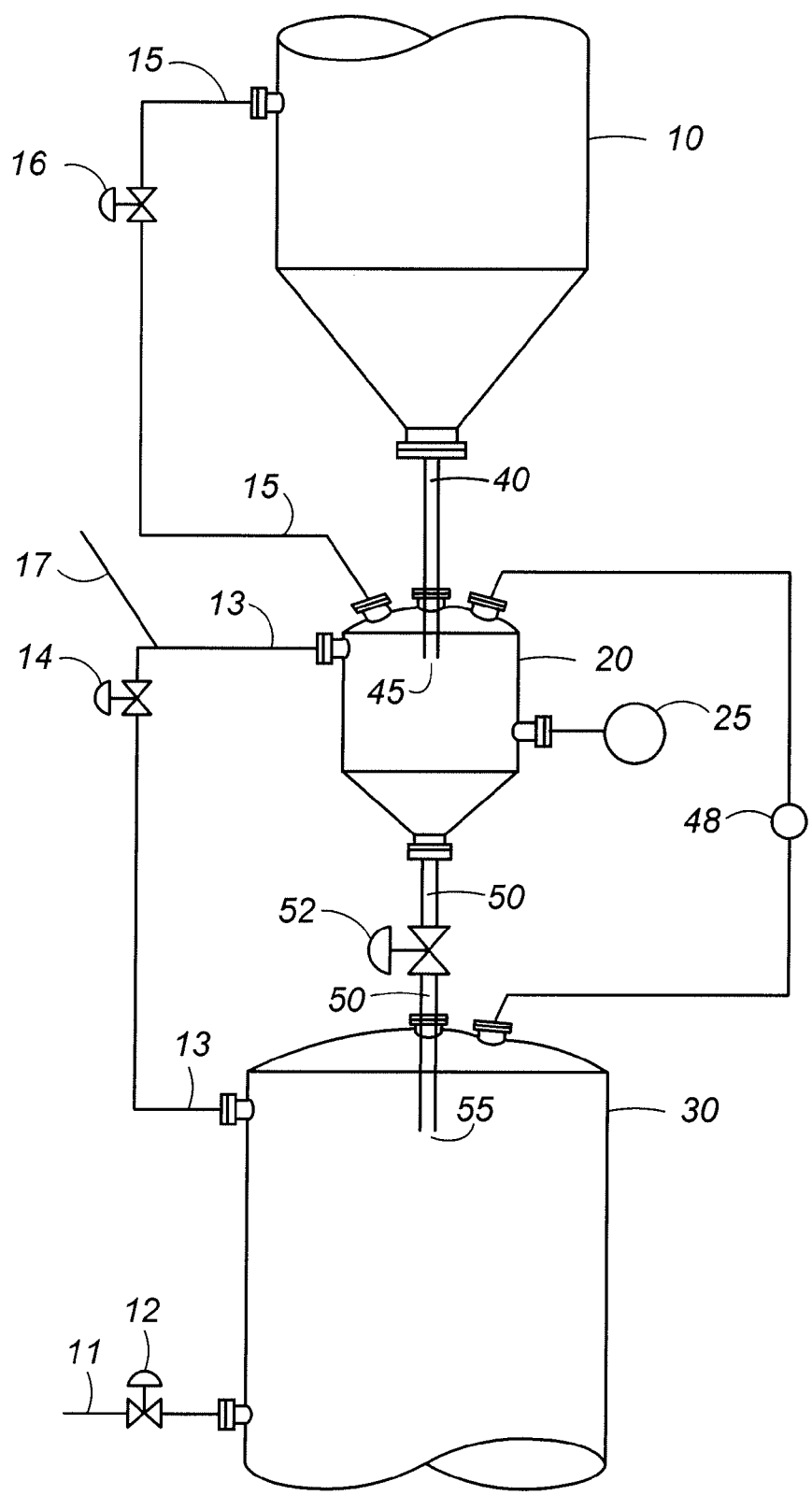
FIG. 2 is a representative view depicting another embodiment of the lower valved conduit and an arrangement of gas conduits used in an embodiment of the invention.

Various configurations of the gas flow path may be used. For example, gas may be introduced to upper zone 10 from an associated process zone and/or via gas conduit 15, which functions as a gas inlet conduit in this embodiment. The pressure of upper zone 10 may be controlled independently of the invention by means, not shown, while the pressure in the upper and middle zones is equilibrated by gas flowing through upper valveless conduit 40. In an embodiment, valve 52 is not gas tight and gas may flow upwards from lower zone 30 through valved conduit 50 and closed valve 52 into middle zone 20. That is valve 52, even when closed, may provide fluid communication between the middle and lower zones. Although not required, gas may be introduced to middle zone 20 during step 1 such as through gas conduit 13 in FIGS. 1 and 3 or gas conduits 17 and 13 in FIG. 2. Gas may also be introduced into middle zone 20 from lower zone 30 through gas conduit 13 and valve 14 as shown in FIG. 2. A portion of the gas entering middle zone 20 during step 1, if any, may flow through gas conduit 15 and valve 16 to upper zone 10 as shown in FIG. 2. In other embodiments not illustrated, a portion of the gas introduced to middle zone 20 may flow through gas conduit 15 to another destination or simply be vented. In the embodiment illustrated in FIG. 3, which depicts the three zones of the apparatus in one vessel, upper valveless conduit 40 has a sufficiently large diameter such that any gas entering middle zone 20 during step 1 may flow upward through upper valveless conduit 40 at a flux which is insufficient to retain the catalyst therein.

Upper valveless particle transfer conduit 40 and/or lower valved particle transfer conduit 50 may have a restriction, that is, a smaller cross-sectional area for particle flow than the balance of the respective conduit. The cross-sectional areas of the restrictions if present and the balance of the conduit may be any regular or irregular shape including a circle, oval, square, rectangle, and triangle. The cross-sectional area shape of a conduit may be the same or it may differ over its length and may be the same or different in the upper and lower conduits. The cross-sectional area of a restriction and the balance of the conduit may have different shapes or the same shape. The restriction may be located in a lower portion of the conduit, that is, in the lower ⅓ of the respective conduit's height. The restrictions may be created in a wide variety of ways including crimping the conduit, using an insert, and forming the conduit with the restriction. Restrictions may be located proximate an outlet in the lowermost end of the conduit. In an embodiment, the conduit, or a portion thereof is tapered toward the outlet to form the restriction at the outlet. The type, cross-sectional area shape, and/or location of restrictions in upper and lower conduits may be the same, or they may differ.

Step 1 ends when middle zone 20 is filled to its operating capacity with particles. As shown in FIG. 1, upper valveless conduit 40 may extend into middle zone 20 to define its operating capacity. That is, particles stop flowing into the middle zone when particles in the middle zone accumulate to reach upper valveless conduit outlet 45. Thus, there may be a continuous mass of particles from a lower portion of upper zone 10 through upper valveless conduit 40, and middle zone 20. In another embodiment, the operating capacity of middle zone 20 is predetermined and an optional upper level particle sensor, not shown, is used to detect when particles rise to this preset level. In such an embodiment, particles need not reach upper valveless conduit outlet 45 and upper valveless conduit 40 need not extend past the shell of middle zone 20. In other embodiments, the operating capacity of middle zone 20 may be determined by a preset time interval. Use of an adjustable timing interval or high level set point enables the size of each particle batch to be varied from cycle to cycle. The particle levels and/or time increments may be measured and a signal sent to a controller to initiate step 2 when the middle zone has been filled. Thus, particles may continue to flow into middle zone 20 for a time after step 2 begins if the particles are below upper valveless conduit outlet 45 at the end of step 1. In other embodiments, the particle flow may be stopped at this point in the cycle and the apparatus may be held with middle zone 20 filled to its operating capacity until it is desired to continue the particle transfer cycle. This portion of the cycle may also be known as a separate hold or ready step. For example, valve 52 is closed to retain the particles in middle zone 20 and particles in the middle zone contact outlet 45 preventing the further transfer of particles out of upper zone 10. Gas may also be introduced to middle zone 20 and directed upwards through upper valveless conduit 40 at a sufficient rate to stop particles from flowing out of the upper zone. In the embodiment of FIG. 2, gas may be introduced to middle zone 20 as discussed above and valve 16 may be closed to force all the gas upwards through upper valveless conduit 40. Similarly, in the embodiment of FIG. 3, valve 14 can be opened to accomplish the same effect.

In step 2 of the cycle, the pressure within middle zone 20 is increased. The middle zone pressure may be increased to stop the transfer of particles from the upper zone. In an embodiment, the middle zone pressure is increased to equilibrate with the higher pressure in lower zone 30. This may be accomplished by introducing gas into middle zone 20 through gas conduit 13. Gas to gas conduit 13 may be supplied from a variety of sources including, but not limited to: gas inlet conduit 11, gas inlet conduit 17, lower zone 30, and separate supply sources such as facility headers and other zones in the associated or other process units. In the embodiment illustrated in FIG. 2, valve 14 is opened and valve 16 is closed to pressurize middle zone 20. In the embodiment shown in FIG. 3, middle zone 20 is pressurized by opening valve 14. There is no need to change the gas flow path as the cycle moves from step 2 to step 3. However, as explained above there are numerous ways of routing the gas flow path to control the desired particle movement. Thus, the invention encompasses changing the gas flow path between and/or within steps 2 and 3 to equilibrate the middle and lower zone pressures and retain particles within upper valveless conduit 40.

Step 3 may be referred to as the empty or unload step of the cycle, and Step 3 may begin when particles begin to flow out of the middle zone. In another embodiment, Step 3 begins when valve 52 opens. After the pressure in the middle zone is increased, valve 52 is opened and particles flow from middle zone 20 through lower valved conduit 50 to lower zone 30. The middle zone pressure may increase further after valve 52 is opened. Lower valved conduit 50 preferably extends into lower zone 30 as shown in FIG. 1, though this extension into lower zone 30 is not required. A number of different events may be used to trigger the opening of valve 52. For example, valve 52 may be opened based on a preset time interval for the particle transfer cycle, or based on a preset time interval from the beginning of step 2. In an embodiment, valve 52 opens in response to one or more pressure indicators. For example, FIG. 1 shows middle zone pressure indicator 28 and lower zone pressure indicator 38 either or both of which may transmit signals to a controller, not shown. The controller may send a signal to open valve 52 when the middle zone pressure reaches a predetermined set point. In another embodiment, the controller compares the middle and lower zone pressures and sends a signal to open valve 52 when the middle and lower zone pressures are sufficiently similar. It is preferable to avoid a pressure differential between the middle and lower zones that is high enough to cause a sudden particle surge when valve 52 opens as this may cause damage to the particles and/or the equipment. Valve 52 may be opened when the middle zone pressure is above, at, or below the lower zone pressure as the particles may flow at least in part by gravity.

In another embodiment as illustrated in FIG. 2, a delta P cell or differential pressure indicator 48 receives signals from the middle and lower zones; determines the difference in pressure between the middle and lower zones; and sends a signal to a controller, not shown. The controller sends a signal to open valve 52 when the differential pressure reaches a predetermined set point. As with other elements illustrated in the Figures, there are myriad, well known ways to measure pressures and send signals giving information about the measurements. The Figures do not limit use of a particular pressure indicator, sensor, or signaling element to the illustrated embodiment. For example, the pressure indicators of FIG. 1 may be used in other embodiments including those illustrated in FIGS. 2 and 3 and different pressures indicators may be used in the embodiment of FIG. 1. In an embodiment, valve 52 is opened to begin step 3 when the middle zone pressure is within about 35 kPa of the lower zone pressure. In another embodiment, valve 52 is opened to begin step 3 when the middle zone pressure is within about 7 kPa of the lower zone pressure; and valve 52 may be opened when the middle zone pressure is within about 3.5 kPa of the lower zone pressure. During step 3, gas continues to flow upward through upper valveless conduit 40 at a sufficient rate to prevent the transfer of particles from upper zone 10 into middle zone 20. The level of particles in middle zone 20 falls as particles flow out of lower valved conduit 50 into lower zone 30.

Particles may remain in middle zone 20 at the end of Step 3 when valve 52 is closed. However, this may result in some particle and/or equipment damage as valve 52 closes on the still flowing particle stream. In another embodiment, Step 3 may end when substantially all of the particles are transferred from middle zone 20 to lower zone 30. Although some particles may still remain in the lower valved conduit 50 and/or middle zone 20, the continuous flow of particles through lower valved conduit 50 may end before valve 52 is closed. That is, particles are no longer being discharged as a continuous mass from outlet 55 of lower valved conduit 50 into the lower zone when valve 52 closes. Preferably, middle zone 20 is empty, i.e. substantially all of the particles have passed through valve 52 before it is closed at the end of step 3.

Again, a wide variety of events can be used to close valve 52. For example, valve 52 may be closed based on a preset time interval for the particle transfer cycle, or based on a preset time interval from the beginning of step 3. Valve 52 may be closed in response to one or more level indicators. For example, a particle level sensor, not shown, may detect a high level of particles in lower zone 30 and send a signal to a controller which in turn sends a signal to close valve 52. In another embodiment, low level particle sensor 25 may detect the absence of particles at the low level set point and send a signal to a controller to close valve 52. Multiple inputs may be used to manage the particle transfer cycle steps. In an embodiment, the length of step 3 may be controlled by a timer with low level particle sensor 25 being used to end step 3 earlier than the preset time interval if the particles fall below the middle zone low level set point faster than expected. In another embodiment, valve 52 is closed in response to the signal from low level particle sensor 25 and a predetermined time interval or delay to allow the remaining mass of particles to flow past or clear valve 52 before it closes. The same inputs may also be used to control multiple actions. For example, the signal from low level particle sensor 25 may be used, either with or without an additional delay time, to close valve 52 and initiate step 4, depressurizing or venting the middle zone. In an embodiment, different time delays may be added by the controller to the same signal, such as, from low level particle sensor 25 so that step 3 ends and step 4 begins at different times. Although the middle zone pressure may begin to decrease before valve 52 closes, it is preferred that valve 52 closes before or at the same time as the middle zone pressure begins to decrease.

With more than one valve in lower valved conduit 50, Step 3 may begin when the last closed valve opens. In an embodiment, the uppermost valve is the last valve that is opened. With more than one valve in lower valved conduit 50, Step 3 may end when the first valve closes. In an embodiment, the uppermost valve is the first valve that is closed. Multiple valves may opened and/or closed simultaneously. Such sequencing of opening and closing multiple valves, if present, is not required but favored to minimize valves moving on the particles and may be readily accomplished for example by a controller with appropriate set points and/or programming.

In step 4, the depressurization step, the pressure in middle zone 20 may be decreased to equilibrate the middle and upper zone pressures. This may be accomplished for example by re-establishing the optional gas flows that were discussed in step 1. In the embodiment of FIG. 2 valve 14 may be closed and valve 16 opened so that gas flows through gas conduit 15 to equalize the pressure between the upper and middle zones. A portion of the gas in middle zone 20 may flow through gas conduit 15 to another destination, not illustrated, or simply be vented such as through gas conduit 13 in FIG. 1. In the embodiment illustrated in FIG. 3, valve 14 may be closed and the pressure between the upper and middle zoned equilibrated through the upper valveless conduit 40. As in step 1, gas may be introduced to middle 20 during step 4 even though the pressure in the middle zone is being decreased.

Figure 3:
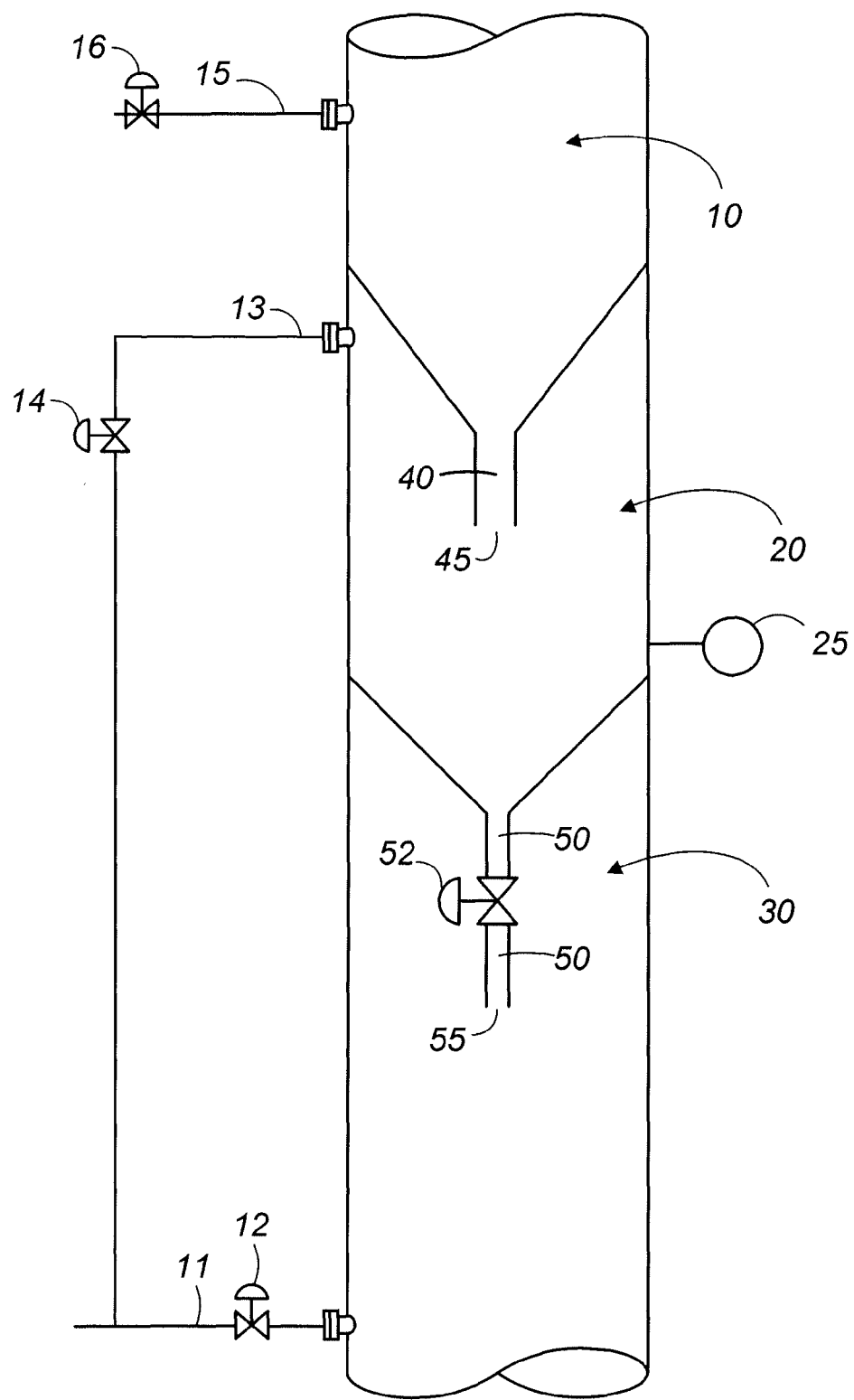
FIG. 3 illustrates another embodiment of the gas conduits of the invention and shows the zones of the apparatus may be within a single vessel.

When the pressure of middle zone 20 is decreased in step 4 to equilibrate with upper zone 10 and increased in step 2 to equilibrate with lower zone 30 it is understood that the pressures in the two zones, superior and inferior, being equilibrated may or may not be the same. For example, pressure differences may exist, if there is some gas flow between the two equilibrated zones, or if they are being controlled independently. Also, there is no requirement that the inferior zone be at the same or lower pressure than the superior zone of the two zones being equilibrated. That is, particles may transfer from either superior zone to the respective inferior zone even though the pressure of the inferior zone is higher than the pressure of the superior zone. The gas flow paths described for the embodiments of FIGS. 2 and 3 show that the invention may provide for the continuous flow of gas to each of the upper, middle, and lower zones throughout a cycle. Further, the embodiment of FIG. 2 may provide an uninterrupted flow of gas from the lower zone through the middle zone and into the upper zone throughout the cycle. In other embodiments not illustrated, various gas conduits may be used to control the middle zone pressure and the gas flow rates through the upper valveless particle transfer conduit to regulate the particle movement as herein described.

It is understood that the step numbers used herein are arbitrary and a transfer cycle may be considered to begin with any step and each step is employed at least once during a cycle. The invention encompasses various orders of the steps and some steps may be repeated in the course of transferring a single batch of particles from the upper zone to the lower zone. For example, the transfer of particles in step 1 may be interrupted by employing steps 2 and 4 multiple times during a transfer cycle. Likewise, step 3 may be interrupted by opening and closing valve 52 multiple times during a transfer cycle, though this is not preferred. Thus, in an embodiment, the order of steps may be 1—transfer particles from the upper zone to the middle zone; 2—increase the middle zone pressure to stop the transfer of particles; 4—decrease the middle zone pressure to equilibrate the middle and upper zone pressures; 1—transfer particles from the upper zone to the middle zone; 2—increase the middle zone pressure to equilibrate the middle and lower zone pressures; 3—transfer particles from the middle zone to the lower zone; and 4—decrease the middle zone pressure to equilibrate the middle and upper zone pressures. In another embodiment the order of steps may be 1, 2, 4, 1, 2, 3, 4, 2, 3, and 4. Other steps such as purging the middle zone may be included in a transfer cycle.

During the particle transfer cycle, the inventory in upper zone 10 may be continuously and/or intermittently replenished with particles such as from an associated or integrated process zone and/or as added from a fresh particle feed hopper. Likewise, particles delivered to lower zone 30 may be withdrawn from or pass out of the lower zone continuously and/or intermittently. It is preferred that an inventory or surge volume of particles be maintained in both the upper and lower zones throughout the particle transfer cycle. As previously described, upper zone 10 may also provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of upper zone 10 may be independently controlled by means well known in the art. For example, upper zone 10 may be in fluid communication with a process zone so that the upper zone pressure depends upon and varies with the pressure in that process zone. The upper zone pressure is not critical and may be atmospheric, sub-atmospheric, or super atmospheric.

Lower zone 30 may be a holding vessel, or surge zone from which the particles are transferred by other means such as pneumatic conveying. In other embodiments, lower zone 30 may provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of lower zone 30 may be independently controlled by means well known in the art. For example, lower zone 30 may be in fluid communication with a process zone so that the lower zone pressure depends upon and varies with the pressure in that process zone. In an embodiment, the upper zone pressure may be higher than the lower zone pressure for a portion of the transfer cycle. In another embodiment, lower zone 30 may be maintained at a higher pressure than upper zone 10. For example, upper zone 10 may be maintained at a nominal pressure of 34 kPa (g) and permitted to vary within a range from about 14 to about 55 kPa (g) while the nominal pressure of lower zone 30 may be 241 kPa (g) within a range from about 207 to about 276 kPa (g). In another embodiment, upper zone 10 may be maintained at a nominal pressure of 241 kPa (g) and permitted to vary within a range from about 172 to about 310 kPa (g) while the pressure of lower zone 30 may be within a range from about 345 to about 2068 kPa (g). Thus, the differential pressure between the lower zone 30 and upper zone 10 might range from about 35 to about 1896 kPa. However, this invention may be used when the pressure differential between zones is as little as about 0.7 kPa and in excess of 2000 kPa. Middle zone 20 serves as an intermediate zone, and its nominal pressure is adjusted to regulate the flow of the particles.

The apparatus of the invention may be used as a solids flow control device for an entire process, since the flow rate of particles from the upper zone to the lower zone can be varied, as discussed above. The upper, middle, and lower zones may contain other non illustrated apparatus known in the art such as baffles, screens, and deflector cones which may be used to facilitate particle flow and/or direct the particles or the gas through a zone in a desired manner. The components of the present invention may be fabricated from suitable materials of construction, such as metals, plastics, polymers, and composites known to the skilled artisan for compatibility with the particles, and operating conditions, e.g. gas, temperature, and pressure. The size, shape, and density of the particles is only limited by the size of the equipment and the type and flow rates of the gas or gases used. In an embodiment, the particles are spheroidal and have a diameter from about 0.7 mm to about 6.5 mm. In another embodiment, the particles have a diameter from about 1.5 mm to about 3 mm. The particles may be catalysts an example of which is disclosed in U.S. Pat. No. 6,034,018.

As previously noted, particle transfer apparatus of the prior art may be adapted to incorporate the invention. Likewise, standard engineering principles especially those related to the flow of solids and gases and known design methods may be used in this invention. For example, it is well known to those skilled in the art of designing solids flow systems to conduct experiments to determine flow characteristics of the particular solid involved. In addition to the teachings herein, the design considerations and methodology described in U.S. Pat. No. 4,576,712 and U.S. Pat. No. 4,872,969 may be used to practice this invention. For example, the pressure in the upper and lower zones, the minimum and maximum gas flow rates upwards through the zones and the valveless conduit, and the required particle transfer rate are design factors that are often fixed by the associated process unit. The length of the particle column inside the valveless conduit, the height of particles in the zone above the valveless conduit, and the diameter of the valveless conduit may be balanced so that changing the pressures and gas flow paths as described herein controls whether particles will flow down through or be retained within the valveless conduit. The design method includes limiting the gas flow rates and pressure differentials to avoid fluidizing particles within the zones and to prevent particles from being suddenly forced up or down the valveless conduits.

Thus, it is known that the internal pressures of the upper and lower zones, the minimum and maximum gas flow rates, the identities of the gas and the particles, and the required range of particle transfer rates, may be used to determine various parameters of the invention. These parameters include: the normal minimum and maximum volumes occupied by the particles in the zones, the particle heights required in the upper zone above the valveless transfer conduit, the diameter of the transfer conduits, the bore or opening size of the valve or valves in the valved transfer conduit, and the lengths of the transfer conduits. These and other parameters such as the gas conduit size and arrangement may characterize a particular embodiment encompassed by the invention.

In an embodiment, a hydrocarbon feed is contacted with catalyst particles moving downward through a hydrocarbon conversion process reaction zone. The catalyst is withdrawn from the reactor and conveyed upwards to a top portion of a regeneration zone. The catalyst passes downward through the regeneration zone undergoing one or more treatment steps. The catalyst is withdrawn from the regeneration zone and passed downward to an upper zone of a particle transfer apparatus. The upper zone pressure may be less than the reaction zone pressure. The particle transfer apparatus transfers the catalyst from the upper zone to the lower zone as described above. The catalyst, now at a higher pressure, may be conveyed upwards to a top or upper portion of the reaction zone by a known pneumatic transport system such as described in U.S. Pat. No. 5,716,516 and U.S. Pat. No. 5,338,440.

Moving bed systems and processes which employ them are well known in the art. See for example U.S. Pat. No. 3,725,249 and U.S. Pat. No. 3,692,496. The reaction zone is oriented substantially vertically (i.e. sufficiently vertical for catalyst to flow downward at least in part by gravity) and may be divided into multiple reactors or sub zones, for example, to manage the heat of reaction. The reaction zone may consist of a single vertical stack of one or more sub zones, or the reaction zone may be split into two or more vertical stacks to manage structural height limitations. A stack may comprise more than one vessel. It is also important to note that the reactants may be contacted with the catalyst bed in either an upward, downward, or radial flow fashion with the latter being preferred. In addition, the hydrocarbon feed may be in the vapor phase when contacting with the catalyst bed. That is, the catalyst moves gradually downward in the reaction and regeneration zones as a non-fluidized, dense phase or compact bed that is withdrawn from the bottom or lower portion of the reaction and regeneration zones and is replenished by adding catalyst to the top portion of these zones. The catalyst withdrawn from the reaction zone is lifted to the top of the regeneration zone by equipment known in the art including mechanical devices such as screw or bucket conveyors or star valves. Preferably, the catalyst is lifted by a pneumatic transport system.

In the reaction zone, the catalyst may deactivate over time by one or more mechanisms including deposition of carbonaceous material or coke upon the catalyst, sintering or agglomeration of catalyst metals, loss of catalytic promoters such as halogens, and exposure to the reaction atmosphere at reaction temperatures up to 760° C. and pressures ranging from about 0 to about 6,900 kPa(g). As used herein, "reaction temperature" means the weighted average inlet temperature (WAIT), which is the average of the inlet temperature to the first bed of catalyst contacted with the feed and each subsequent bed of catalyst following a heating or cooling stage to manage the heat of reaction weighted by the quantity of catalyst in the corresponding reactor. Frequently, the reaction conditions include the presence of hydrogen that may be introduced separately or combined with the hydrocarbon feed. Hydrocarbon products from the reactor are often cooled and separated into vapor and liquid streams such as in a flash drum or vapor/liquid separator. All or a portion of the vapor stream, containing hydrogen may be recycled to the reaction zone while the liquid stream may be sent to storage, blended with other streams or processed further.

The regeneration zone is designed and operated to restore or rejuvenate the catalyst performance and may include multiple zones and/or treatment steps. Non-limiting examples include a burn or combustion zone, a halogenation zone, a drying zone, and a cooling zone. The regeneration zone may include other known zones such as an elutriation zone and a disengaging zone. The regeneration zone may comprise one or more vessels which are substantially vertically aligned in one or more stacks. Additional regeneration zone details are available in the art such as U.S. Pat. No. 6,034,018. The regeneration zone may operate at a pressure ranging generally from about 0 to about 6900 kPa(g) and a temperature from about 370° C. to about 538° C. Often, the regeneration zone includes an atmosphere containing oxygen in contrast to the reaction zone hydrocarbon/hydrogen atmosphere. Thus, separation of the reactor and regenerator atmospheres may be important to prevent undesirable side reactions. Various known elements such as nitrogen seals or bubbles, isolation valves, and pressure differentials to maintain desired purges and gas flows may be used to prevent the hydrogen and oxygen atmospheres from mixing.

The catalyst being withdrawn from the reaction zone may be purged with hydrogen to keep excess hydrocarbons in the reaction product stream. In an embodiment, the reaction zone atmosphere such as hydrogen and/or remaining hydrocarbon gas surrounding the catalyst is purged with nitrogen before the catalyst enters the oxygen containing atmosphere. Oxygen may be introduced to the regenerator vessel, or oxygen may be added upstream of the regenerator, for example, in a disengaging vessel or isolation valves of the regeneration zone. This change from the reaction zone atmosphere to an inert or nitrogen atmosphere may be conducted before or after the catalyst is lifted or conveyed from the bottom of the reaction zone to the top of the regeneration zone. Likewise, the change from the regeneration zone oxygen atmosphere may be accomplished by a nitrogen purge followed by introduction of a reaction zone gas or reducing gas, such as hydrogen. This atmosphere change is usually completed below the regeneration zone before the catalyst enters the upper zone of the particle transfer zone or apparatus. However, this atmosphere change may be accomplished within the particle transfer apparatus or after the catalyst exits the particle transfer apparatus, before or after the catalyst is lifted to the top of the reactor zone. Low pressure differentials ranging for example from about 2 to about 14 kPa may be sufficient to maintain proper nitrogen purges or flows to keep the regeneration and reaction zone atmospheres separated. Catalyst may be purged with nitrogen in a conduit or the catalyst may enter a nitrogen containing vessel as it moves through the process.

The catalyst may also undergo a reduction step. If needed, the reduction step is normally performed after the catalyst leaves the regenerator vessel when the catalyst is under a reducing gas or reaction zone gas atmosphere. In an embodiment, the reduction step occurs in the upper zone of the particle transfer apparatus. In another embodiment, the reduction step occurs in a reduction zone located atop the reactor in the reaction zone. Typical reduction conditions include an atmosphere comprising hydrogen, a temperature ranging from about 315° C. to about 540° C., and a super atmospheric pressure.

In an embodiment, the hydrocarbon conversion process is a reforming process which is well known in the petroleum refining and petrochemical industries. In brief, the reforming feed comprises a petroleum fraction known as naphtha which may have an initial boiling point from about 40° C. to about 120° C. and an end boiling point from about 145° C. to about 218° C. In an embodiment, the naphtha has an initial boiling point from about 65° C. to about 104° C. and an end boiling point from about 150° C. to about 195° C. The naphtha feed may be a straight run petroleum fraction and/or obtained as a product from one or more petroleum and petrochemical processes such as hydrocracking, hydrotreating, FCC, coking, stream cracking, and any other process which produces a hydrocarbon product in the naphtha boiling range. A number of different reactions may occur in a reforming process including the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of paraffins, isomerization of alkylcycloparaffins to yield cyclohexanes, isomerization of substituted aromatics, and hydrocracking of paraffins. As a result, reforming is an overall endothermic process and it is common to use more than one reaction zone to allow reheating of the reactants in order to obtain the desired performance.

Reforming conditions may include reaction temperatures from about 425° C. to about 580° C., preferably from about 450° C. to about 560° C.; a pressure from about 240 kPa(g) to about 4830 kPa(g), preferably from about 310 kPa(g) to about 1380 kPa(g); and a liquid hourly space velocity (LHSV), defined as liquid volume of fresh feed per volume of catalyst per hour, from about 0.2 to about 10 $hr^{-1}$. The reforming reaction is carried out in the presence of sufficient hydrogen to provide a hydrogen/hydrocarbon mole ratio from about 0.5:1 to about 10:1. A reforming catalyst typically comprises one or more noble metals (e.g., platinum, iridium, rhodium, and palladium), a halogen component, and a porous carrier or support, such as an alumina. Exemplary catalysts are disclosed in U.S. Pat. No. 6,034,018. The regeneration zone pressure may range from about 0 kPa(g) to about 345 kPa(g). In an embodiment, the regeneration zone pressure ranges from about 0 kPa(g) to about 103 kPa(g), and in another embodiment from about from about 172 kPa(g) to about 310 kPa(g).

The hydrocarbon conversion process may be a dehydrocyclodimerization process wherein the feed comprises $C_2$ to $C_6$ aliphatic hydrocarbons which are converted to aromatics. Preferred feed components include $C_3$ and $C_4$ hydrocarbons such as isobutane, normal butane, isobutene, normal butene, propane and propylene. Diluents, e.g. nitrogen, helium, argon, and neon may also be included in the feed stream. Dehydrocyclodimerization operating conditions may include a reaction temperature from about 350° C. to about 650° C.; a pressure from about 0 kPa(g) to about 2068 kPa(g); and a liquid hourly space velocity from about 0.2 to about 5 $hr^{-1}$. Preferred process conditions include a reaction temperature from about 400° C. to about 600° C.; a pressure from about 0 kPa(g) to about 1034 kPa(g); and a liquid hourly space velocity of from 0.5 to 3.0 $hr^1$. It is understood that, as the average carbon number of the feed increases, a reaction temperature in the lower end of the reaction temperature range is required for optimum performance and conversely, as the average carbon number of the feed decreases, the higher the required reaction temperature. Details of the dehydrocyclodimerization process are found for example in U.S. Pat. No. 4,654,455 and U.S. Pat. No. 4,746,763.

The dehydrocyclodimerization catalyst may be a dual functional catalyst containing acidic and dehydrogenation components. The acidic function is usually provided by a zeolite which promotes the oligomerization and aromatization reactions, while a non-noble metal component promotes the dehydrogenation function. Exemplary zeolites include ZSM-5, ZSM-8, ZSM-11, ZSM-12, and ZSM-35. One specific example of a catalyst disclosed in U.S. Pat. No. 4,746,763 consists of a ZSM-5 type zeolite, gallium and a phosphorus containing alumina as a binder. Multiple reactors or reaction zones may be used to manage the heat of reaction as described above for the reforming process. The dehydrocyclodimerization process regeneration zone pressure may range from about 0 kPa(g) to about 103 kPa(g). In a particular embodiment, the regeneration conditions may include a step comprising exposing the catalyst to liquid water or water vapor as detailed in U.S. Pat. No. 6,657,096.

In an embodiment, the hydrocarbon conversion process is a dehydrogenation process for the production of olefins from a feed comprising a paraffin. The feed may comprise $C_2$ to $C_{30}$ paraffinic hydrocarbons and in a preferred embodiment comprises $C_2$ to $C_5$ paraffins. General dehydrogenation process conditions include a pressure from about 0 kPa(g) to about 3500 kPa(g); a reaction temperature from about 480° C. to about 760° C.; a liquid hourly space velocity from about 1 to about 10 $hr^{-1}$; and a hydrogen/hydrocarbon mole ratio from about 0.1:1 to about 10:1. Dehydrogenation conditions for $C_4$ to $C_5$ paraffin feeds may include a pressure from about 0 kPa(g) to about 500 kPa(g); a reaction temperature from about 540° C. to about 705° C.; a hydrogen/hydrocarbon mole ratio from about 0.1:1 to about 2:1; and an LHSV of less than 4. Additional details of dehydrogenation processes and catalyst may be found for example in U.S. Pat. No. 4,430,517 and U.S. Pat. No. 6,969,496.

Generally, the dehydrogenation catalyst comprises a platinum group component, an optional alkali metal component, and a porous inorganic carrier material. The catalyst may also contain promoter metals and a halogen component which improve the performance of the catalyst. In an embodiment, the porous carrier material is a refractory inorganic oxide. The porous carrier material may be an alumina with theta alumina being a preferred material. The platinum group includes palladium, rhodium, ruthenium, osmium and iridium and generally comprises from about 0.01 wt % to about 2 wt % of the final catalyst with the use of platinum being preferred. Potassium and lithium are preferred alkali metal components comprising from about 0.1 wt % to about 5 wt % of the final catalyst. The preferred promoter metal is tin in an amount such that the atomic ratio of tin to platinum is between about 1:1 and about 6:1. A more detailed description of the preparation of the carrier material and the addition of the platinum component and the tin component to the carrier material may be obtained by reference to U.S. Pat. No. 3,745,112. Again, multiple reactors or reaction zones may be used to manage the heat of reaction as described above for the reforming process. The dehydrogenation process regeneration zone pressure may range from about 0 kPa(g) to about 103 kPa(g).

The invention claimed is:

1. An apparatus for transferring particles, the apparatus comprising:
   (a) an upper zone;
   (b) a middle zone operable for pressurization and depressurization;
   (c) a lower zone;
   (d) an upper valveless conduit extending downward from the upper zone to the middle zone, the upper valveless conduit of a length operable to transfer particles from the upper zone to the middle zone;
   (e) a lower valved conduit comprising a first valve, the lower valved conduit extending downward from the middle zone to the lower zone, the lower valved conduit of a length operable to transfer particles from the middle zone to the lower zone;
   (f) a first gas conduit in fluid communication with the middle zone; and
   (g) at least one of a controller, a particle level sensor, a pressure gauge, a pressure indicator, a differential pressure sensor, and a timer operable to control the transfer of particles;
   wherein the apparatus is operable for transferring particles with a gas, from the upper zone, operable at a first pressure, to the lower zone, operable at a second pressure, when the second pressure is greater than the first pressure.

2. The apparatus of claim 1 wherein the first valve provides fluid communication between the middle and lower zones.

3. The apparatus of claim 1 wherein the first valve is a gas tight valve.

4. The apparatus of claim 1 wherein the lower valved conduit further comprises a second valve.

5. The apparatus of claim 4 wherein the second valve is a gas tight valve and the first valve is located above the second valve.

6. The apparatus of claim 1 further comprising a first gas inlet conduit in fluid communication with the lower zone.

7. The apparatus of claim 1 further comprising a second gas inlet conduit in fluid communication with the upper zone.

8. The apparatus of claim 1 further comprising a vessel wherein the upper zone, the middle zone, and the upper valveless conduit are located within the vessel.

9. The apparatus of claim 1 further comprising a vessel wherein the upper zone, the middle zone, the lower zone, the upper valveless conduit and the lower valved conduit are located within the vessel.

10. The apparatus of claim 1 further comprising a second gas conduit providing fluid communication between the middle zone and the lower zone; wherein the first gas conduit provides fluid communication between the middle zone and the upper zone.

11. The apparatus of claim 1 wherein at least one of the upper valveless conduit and the lower valved conduit is oriented vertically.

12. The apparatus of claim 1 wherein the upper valveless conduit has a flow restriction.

13. The apparatus of claim 12 wherein the upper valveless conduit is tapered towards an outlet to form the restriction at the outlet.

14. The apparatus of claim 1 wherein the upper valveless conduit extends into the middle zone.

15. The apparatus of claim 1 wherein the lower valved conduit extends into the lower zone.

16. The apparatus of claim 1 wherein the middle zone further comprises a particle sensor.

17. The apparatus of claim 1 wherein the middle zone further comprises a pressure indicator.

18. The apparatus of claim 1 wherein the lower zone further comprises a pressure indicator.

19. The apparatus of claim 1 further comprising a differential pressure indicator, the differential pressure indicator being in communication with the middle zone and the lower zone.

20. An apparatus for transferring particles, the apparatus comprising:
   (a) an upper zone;
   (b) a middle zone operable for pressurization and depressurization, the middle zone comprising a particle sensor and a pressure indicator;
   (c) a lower zone;
   (d) an upper valveless conduit extending downward from the upper zone to the middle zone, the upper valveless conduit of a length operable to transfer particles from the upper zone to the middle zone;
   (e) a lower valved conduit comprising a first valve, the lower valved conduit extending downward from the middle zone to the lower zone, the lower valved conduit of a length operable to transfer particles from the middle zone to the lower zone;
   (f) a first gas conduit in fluid communication with the middle zone; and
   (g) at least one of a controller, a particle level sensor, a pressure gauge, a pressure indicator, a differential pressure sensor, and a timer operable to control the transfer of particles;

wherein the apparatus is operable for transferring particles with a gas, from the upper zone, operable at a first pressure, to the lower zone, operable at a second pressure, when the second pressure is greater than the first pressure.

* * * * *